(12) United States Patent
Takagami et al.

(10) Patent No.: US 7,968,149 B2
(45) Date of Patent: Jun. 28, 2011

(54) REGENERATION APPARATUS AND REGENERATION METHOD FOR ELECTROLESS PLATING

(75) Inventors: Hidenori Takagami, Takasago (JP); Hiroshi Kawakami, Funabashi (JP); Kazuhiko Kato, Ashiya (JP)

(73) Assignee: Murata Co., Ltd., Kobe-shi (JP)

( * ) Notice: Subject to any disclaimer, the term of this patent is extended or adjusted under 35 U.S.C. 154(b) by 0 days.

(21) Appl. No.: 12/981,943

(22) Filed: Dec. 30, 2010

(65) Prior Publication Data

US 2011/0094410 A1 Apr. 28, 2011

Related U.S. Application Data

(62) Division of application No. 11/483,357, filed on Jul. 7, 2006, now Pat. No. 7,892,603.

(30) Foreign Application Priority Data

Jul. 12, 2005 (JP) ................................. 2005-203266

(51) Int. Cl.
*B01J 49/00* (2006.01)
(52) U.S. Cl. ........ 427/345; 118/684; 118/690; 118/710; 118/715; 118/254; 204/402; 204/555; 427/58; 427/337; 427/343; 427/430.1
(58) Field of Classification Search .................. 204/402, 204/555; 427/345
See application file for complete search history.

(56) References Cited

U.S. PATENT DOCUMENTS

| | | | |
|---|---|---|---|
| 5,609,767 | A | 3/1997 | Eisenmann |
| 6,391,177 | B1 | 5/2002 | Crotty |

FOREIGN PATENT DOCUMENTS

| | | |
|---|---|---|
| CN | 1208442 A | 2/1999 |
| JP | 36-3557 | 4/1936 |
| JP | 59-089757 A | 5/1984 |

(Continued)

OTHER PUBLICATIONS

Japanese Office Action dated Apr. 8, 2008 issued in Japanese Application No. 2005-203266, which is a Japanese counterpart of parent U.S. Appl. No. 11/483,357.
Chinese Office Action dated Jan. 9, 2009 issued in Chinese Application No. 200610101893.4, which is a Chinese counterpart of parent U.S. Appl. No. 11/483,357.
European Office Action dated Dec. 9, 2009 issued in European Application No. 06014250.2, which is an European counterpart of parent U.S. Appl. No. 11/483,357.

(Continued)

*Primary Examiner* — Michael Kornakov
*Assistant Examiner* — Alexander Weddle
(74) *Attorney, Agent, or Firm* — Holtz, Holtz, Goodman & Chick, PC

(57) ABSTRACT

A regeneration apparatus for an electroless plating solution, which includes a sensor for measuring the formation rate of phosphorous acid formed in a plating tank in response to a plating treatment, a split device for taking out a plating solution in the plating tank to transfer the plating solution to a first processing tank, a sensor for measuring the concentration of the phosphorous acid contained in the plating solution taken out, an addition device for supplying calcium carbonate or calcium hydroxide, an amount of which is required for producing a calcium phosphite from the phosphorous acid contained in the plating solution, to the first processing tank, a separation device for separating and removing the calcium phosphite produced in the first processing tank from the plating solution, and a return pump for transferring the plating solution from which the calcium phosphite has been separated and removed to the plating tank.

1 Claim, 4 Drawing Sheets

FOREIGN PATENT DOCUMENTS

| | | | |
|---|---|---|---|
| JP | 2769774 | B2 | 4/1998 |
| JP | 2000-503354 | A | 3/2000 |
| JP | 2001-192849 | A | 7/2001 |
| JP | 2002-241952 | A | 8/2002 |
| JP | 2002241952 | A * | 8/2002 |
| WO | WO 98/21381 | A | 5/1998 |
| WO | WO 99/39023 | A2 | 8/1999 |

OTHER PUBLICATIONS

R. W. Anderson et al: "Rejuvenating Electroless Solutions"; Plating and Surface Finishing; pp. 18-26; Mar. 1992.

Winkler et al, "Chemisches Vernickeln (außenstromlos)—Automatische Prozeßüberwachung erhöht die Qualität," *INDUSTRIE*ANZEIGER, vol. 19, Mar. 7, 1986, pp. 20-22.

* cited by examiner

REGENERATION APPARATUS AND REGENERATION METHOD FOR ELECTROLESS PLATING

CROSS-REFERENCE TO RELATED APPLICATIONS

This application is a Divisional Application of U.S. application Ser. No. 11/483,357, filed Jul. 7, 2006, now U.S. Pat. No. 7,892,603 which is based upon and claims the benefit of priority from prior Japanese Patent Application No. 2005-203266, filed Jul. 12, 2005, the entire contents of which are incorporated herein by reference.

BACKGROUND OF THE INVENTION

1. Field of the Invention

The present invention relates generally to an electroless plating technology in which a material to be plated is immersed in a plating solution to apply nickel plating, and particularly to an apparatus and a method for regenerating an electroless plating solution, which has been used in a plating treatment, in order to reuse it.

2. Description of the Related Art

Heretofore, in an electroless plating method in which, for example, hypophosphite is used as a reducing agent for applying nickel plating, a material prepared by combining nickel sulfate (nickel source) with sodium hypophosphite (reducing agent) is usually applied. When electroless nickel plating is conducted by the use of the plating solution having such a composition as described above, phosphite produced as a result of oxidation of hypophosphite, sulfate of a reaction residue derived from nickel sulfate used for the nickel source, and further, a sodium salt or ammonium hydroxide being a reaction residue of sodium hydroxide or ammonium hydroxide used for pH adjustment are accumulated in the plating solution over time, resulting in decrease in plating rate, the appearance of abnormal precipitation, deterioration of film characteristic properties and the like.

Under the circumstances, the plating solution is renewed after a certain period of service, while the used plating solution is treated as industrial waste. In this respect, however, since 1995, dumping of waste at sea has been banned under the Convention on the Prevention of Marine Pollution by Dumping of Waste and other Matter, and punishment for dumping waste on land has become severe. Therefore, it is very important to cut down the waste amount of the plating solution used, or to develop a method for regenerating the plating solution used.

Concerning the removal of sodium phosphite or sodium sulfate accumulated in the course of electroless nickel plating operation, a variety of approaches has been made already; the fact is, however, that none of these approaches can reach industrial practical application. For instance, as a method for removing sodium phosphite or sodium sulfate, a method for separating unnecessary components by means of electrodialysis with the use of a diaphragm is known. According to the method, however, there are such disadvantages that effective components are removed from the plating solution together with the unnecessary components, and in addition, that the apparatus therefor becomes big and expensive.

In R. W. Anderson et al., Plating and Surface Finishing, March 1992, there is proposed a regeneration method in which nickel ions and sodium ions have been previously separated by the use of an ion exchange resin from a plating solution, a calcium or magnesium salt is added to the remaining solution to insolubilize the sulfates and phosphites thereby separating them, so that the nickel and sodium ions which have been allowed to adsorb to the ion exchange resin are fractionated/desorbed, and then, only the nickel ions are returned to the plating solution to recycle it. However, the method involves technical and economical problems, so that the method has not yet been applied for practical use.

Furthermore, many other methods such as a method in which a plating solution is cooled to crystallize sodium sulfate thereby separating the sodium sulfate, and then calcium sulfate and calcium hydroxide is added to the plating solution so as to be 5.5 to 7.0 pH, whereby only the phosphite is selectively separated and removed as a calcium salt (Jpn. Pat. Appln. KOKOKU Publication No. 36-3557); a method in which ammonium hydroxide has been previously added to a plating solution, then, a hydroxide such as calcium, barium, and strontium is added to the plating solution to selectively precipitate and separate only the phosphite from the plating solution; or a hydroxide of an alkaline earth metal is added, then, sulfuric acid is added to the plating solution so as to obtain 4 to 6 pH to precipitate and separate the phosphite, whereby the plating solution is regenerated (Japanese Patent No. 2769774) are proposed. However, any of these involves many problems in view of practical use.

Namely, a conventional technology for generating an electroless plating solution involves the problems as mentioned hereinafter.

A large amount of a sulfate existing in an electroless plating solution accompanies not only extreme difficulty in separation from the plating solution, but also increase in a solubility of calcium phosphite, so that it becomes a significant disability for separating the phosphite. Thus, the plating solution used in the present invention is based on the premise of containing no sulfate.

More specifically, a part of a plating solution is drawn, calcium hydroxide or calcium carbonate is added to the plating solution so drawn to fix it as calcium phosphite in an electroless plating method in which a material to be plated is immersed into a plating solution in which nickel hypophosphite is used as a nickel source and at least one or more members selected from nickel hypophosphite, hypophosphorous acid, and sodium hypophosphite is used together as a reducing agent, whereby nickel plating is conducted.

The present inventors have proposed in Jpn. Pat. Appln. KOKAI Publication No. 2001-192849 that an amount of a calcium salt to be added is adjusted such that a pH of a plating solution does not exceed 5.8, whereby only the phosphite which is a component unnecessary for plating is separated and removed from the system, so that the resulting plating solution is recycled without losing effective plating components.

Thereafter, there has been proposed such a method and an apparatus for liquid management in Jpn. Pat. Appln. KOKAI Publication No. 2002-241952 that a drawing rate of a part of a plating solution to be drawn from the plating solution and an amount of calcium hydroxide or calcium carbonate to be added for precipitating and separating the phosphite is adjusted in an amount corresponding to that of the phosphite which will be produced by the plating reaction, whereby a concentration of the phosphite in the plating solution is maintained at a value within a range (50 to 100 g/l) which has been previously set, and further none of the components not required for the plating reaction is applied.

However, since there is no contrivance for automation as to the drawn rate of the plating solution for separating the phosphite, it is required to calculate an amount of the plating solution to be drawn and an amount of the calcium hydroxide or calcium carbonate to be added in each case based on the plating throughput to be processed, and thus, there is a problem of poor multiusability.

BRIEF SUMMARY OF THE INVENTION

The present invention has been made in view of the circumstances as described above, and an object of the invention is to provide a regenerating apparatus and a regenerating method for an electroless plating solution by which the regenerating treatment of the electroless plating solution can be efficiently and automatically practiced.

In order to achieve the above-described object, the present invention takes the measures as described hereunder.

Specifically, a first aspect of the present invention provides a regeneration apparatus for an electroless plating solution in which the electroless plating solution applied for a plating treatment is regenerated to be used again in the plating treatment plating solution, comprising: a plating tank; formation rate measurement means; first and second transfer means; concentration measurement means; calculation means; first supply means; separation and removal means; and control means.

The plating tank accumulates a plating solution in which nickel hypophosphite is used as a nickel source and further, at least one or more members of nickel hypophosphite, sodium hypophosphite, and hypophosphorous acid are used as reducing agents, and applies a nickel plating to a target material by the use of the plating solution. The formation rate measurement means measures the formation rate of phosphorous acid formed in accordance with the nickel plating treatment. The first transfer means takes out a predetermined amount of the plating solution accumulated in the plating tank to transfer to a split tank at the transfer rate in accordance with a control signal, when receiving the control signal. The concentration measurement means measures a concentration of the phosphorous acid contained in the predetermined amount of the plating solution taken out. The calculation means calculates an amount of calcium carbonate or calcium hydroxide required for producing a calcium phosphite from the phosphorous acid contained in the predetermined amount of the plating solution based on the predetermined amount and the concentration of the phosphorous acid determined by the concentration measurement means. The first supply means supplies an amount, which is calculated by the calculation means, of calcium carbonate or calcium hydroxide to the split tank. The separation and removal means separates and removes the calcium phosphite which is formed by mixing the calcium carbonate or the calcium hydroxide supplied to the split tank with the predetermined amount of the plating solution in the split tank from the plating solution. The second transfer means transfers the plating solution from which calcium phosphite has been separated and removed by the separation and removal means to the plating tank in cooperation with the first transfer means at the transfer rate in accordance with the control signal, when receiving the control signal. The control means generates the control signal for controlling the transfer rates of the first and second transfer means based on the formation rate determined by the formation rate measurement means to output the control signal generated to the first and second transfer means.

A second aspect of the present invention provides the regeneration apparatus for the electroless plating solution according to the first aspect, wherein the formation rate measurement means includes at least any one member from the group consisting of: pH measurement means for measuring a pH of the plating solution in the plating tank to determine the formation rate of the phosphorous acid based on the pH value measured; specific gravity measurement means for measuring a specific gravity of the plating solution in the plating tank to determine the formation rate of the phosphorous acid based on the specific gravity measured; nickel concentration measurement means for measuring a nickel concentration of the plating solution in the plating tank to determine the formation rate of the phosphorous acid based on the nickel concentration measured; refractive index measurement means for measuring a refractive index of the plating solution in the plating tank to determine the formation rate of the phosphorous acid based on the refractive index measured; infrared spectroscopic measurement means for measuring infrared spectroscopic characteristics of the plating solution in the plating tank to determine the formation rate of the phosphorous acid based on the infrared spectroscopic characteristics measured; electrophoresis measurement means for conducting an electrophoresis capillary chromatography measurement with respect to the plating solution in the plating tank to determine the formation rate of the phosphorous acid based on the measurement result; liquid chromatography measurement means for conducting a high-performance liquid chromatography measurement with respect to the plating solution in the plating tank to determine the formation rate of the phosphorous acid based on the measurement result; ultraviolet spectroscopic measurement means for measuring ultraviolet spectroscopic characteristics of the plating solution in the plating tank to determine the formation rate of the phosphorous acid based on the ultraviolet spectroscopic characteristics measured; ion chromatography measurement means for conducting an ion chromatography measurement with respect to the plating solution in the plating tank to determine the formation rate of the phosphorous acid based on the measurement result; and visible light colorimetric measurement means for conducting a visible light colorimetric measurement with respect to the plating solution in the plating tank to determine the formation rate of the phosphorous acid based on the measurement result.

A third aspect of the present invention provides the regeneration apparatus for the electroless plating solution according to the first or second aspect, wherein the first transfer means comprises: split means for taking out the predetermined amount or more of the plating solution accumulated in the plating tank; meterage means for adjusting an amount of the plating solution taken out by the split means to the predetermined amount; and a transfer section which transfers the predetermined amount of the plating solution which has been adjusted by the meterage means to the split tank.

A fourth aspect of the present invention provides the regeneration apparatus for the electroless plating solution according to the first or second aspect, wherein the split tank comprises: first agitation means for agitating the calcium carbonate or the calcium hydroxide supplied to the split tank by means of the first supply means and the predetermined amount of the plating solution in the split tank; and temperature control means for maintaining a liquid temperature in the split tank at a value within a range which has been determined previously.

A fifth aspect of the present invention provides the regeneration apparatus for the electroless plating solution according to the first or second aspect, wherein the separation and removal means comprises: separation section which separates the calcium phosphite formed from the plating solution by means of any one of pressure filtration, depressure filtration, and centrifugal separation; and a throw-out section which throws out the calcium phosphite separated by the separation section outside the apparatus.

A sixth aspect of the present invention provides the regeneration apparatus for the electroless plating solution according to the first or second aspect, further comprising: an intermediate tank, disposed between the separation and removal means and the second transfer means, for accumulating the plating solution from which the calcium phosphite has been removed by the separation and removal means until the plating solution is transferred by the second transfer means; second supply means for supplying hypophosphorous acid to the intermediate tank; second agitation means for agitating the liquid in the intermediate tank; and a pH sensor which measures the pH of the liquid in the intermediate tank.

A seventh aspect of the present invention provides a regeneration method for an electroless plating solution in which the electroless plating solution applied for a plating treatment is regenerated to be used again in the plating treatment, comprising the steps of: measuring a formation rate of a phosphorous acid formed in accordance with a nickel plating treatment in a plating tank to accumulate a plating solution in which nickel hypophosphite is used as a nickel source and at least one or more members of nickel hypophosphite, sodium hypophosphite, and hypophosphorous acid are used as reducing agents, and to apply the nickel plating treatment to a target material by the use of the plating solution; generating a control signal for controlling transfer rates of first and second transfer means based on the formation rate measured to output the control signal generated to the first and the second transfer means; taking out a predetermined amount of the plating solution accumulated in the plating tank to transfer the same to the split tank at the transfer rate in accordance with the control signal, when the control signal is received by the first transfer means; measuring a concentration of the phosphorous acid contained in the predetermined amount of the plating solution taken out; calculating an amount of the calcium carbonate or the calcium hydroxide required for producing a calcium phosphite from the phosphorous acid contained in the predetermined amount of the plating solution based on the predetermined amount and the concentration of the phosphorous acid measured; supplying the calculated amount of calcium carbonate or the calcium hydroxide to the split tank; separating and removing the calcium phosphite formed by admixing the calcium carbonate or the calcium hydroxide supplied to the split tank with the predetermined amount of the plating solution in the split tank from the plating solution; and transferring the plating solution from which the calcium phosphite is separated and removed at the transfer rate in accordance with the control signal in cooperation with the first transfer means to the plating tank, when the control signal is received by the second transfer means.

According to the regenerating apparatus and the regenerating method for an electroless plating solution of the present invention, it becomes possible to carry out efficiently and automatically regenerating treatment of the electroless plating solution, so that calcium phosphite separated contains little amount of impurities, and hence, it is reusable as an industrial product and no industrial waste is produced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

In the following, the best mode for practicing the present invention will be described by referring to the accompanying drawings.

Figure 1:
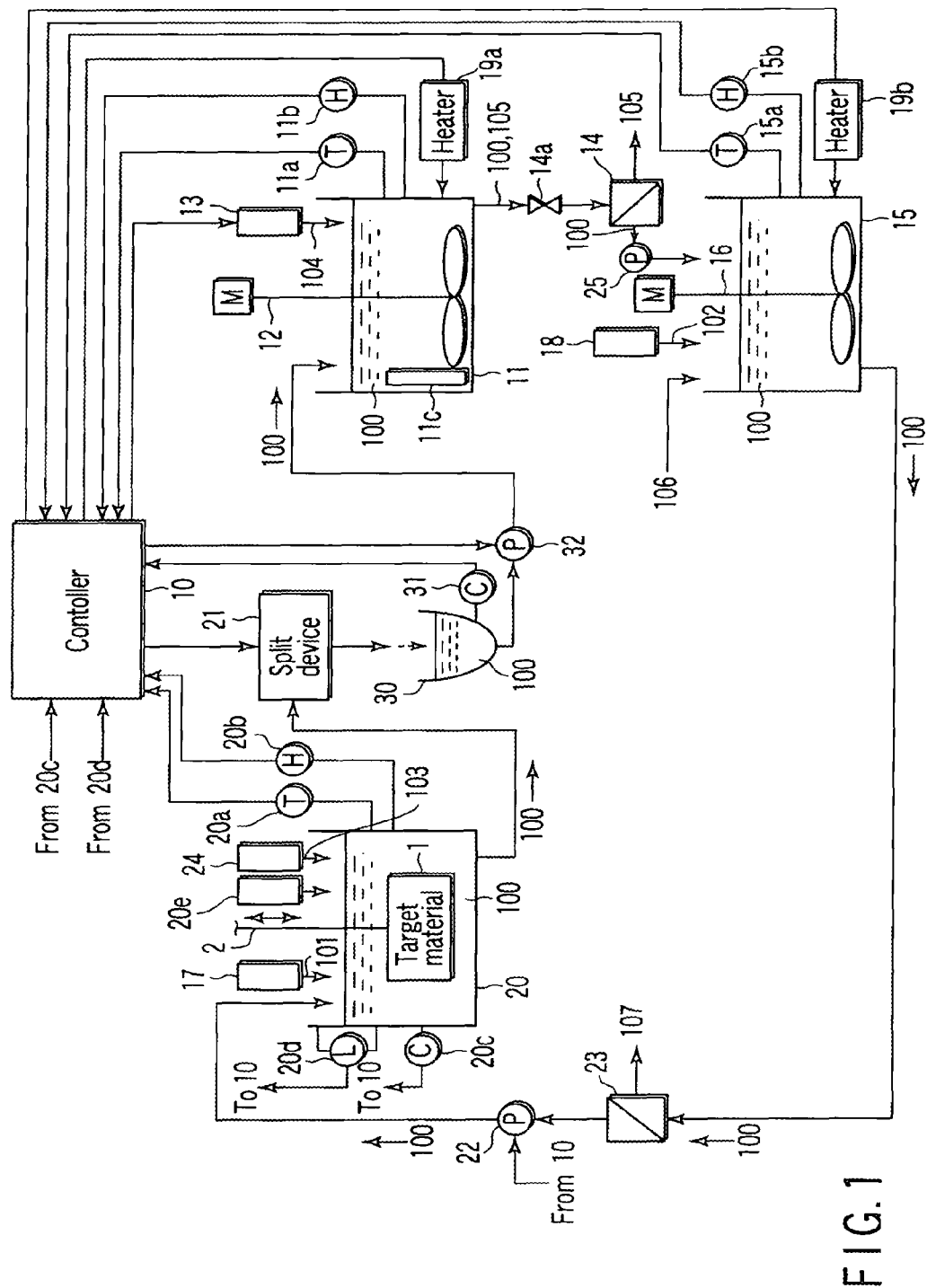
FIG. 1 is a schematic diagram showing a constitutional example of a regenerating apparatus to which a regenerating method for an electroless plating solution according to an embodiment of the present invention is applied.

FIG. 1 is a schematic diagram showing a constitutional example of a regenerating apparatus to which a regenerating method for an electroless plating solution according to an embodiment of the present invention is applied.

More specifically, the regenerating apparatus is provided with a plating tank 20 having a built-in heating device; and the plating tank 20 accumulates a plating solution 100 wherein nickel hypophosphite is used as a nickel source 101, and further at least one or more members selected from nickel hypophosphate, sodium hypophosphate, and hypophosphorous acid are used as reducing agents, the plating tank 20 further serving to contain a target material 1 therein to apply nickel plating to the target material 1.

As facilities associated with the plating tank 20, the regenerating apparatus is provided with a replenishment device 17 for replenishing a nickel source consumed with the progress of the nickel plating on the target material 1 into the plating tank 20, an addition device 24 for adding a pH adjustment agent 103 made of a sodium hydroxide solution into the plating tank 20, a hoisting attachment 2 for suspending the target material 1 so as to be vertically movable, a temperature sensor 20$a$, a pH sensor 20$b$, a nickel ion concentration sensor 20$c$, a liquid level meter 20$d$, and a reducing agent replenishment device 20$e$ for replenishing sodium hypophosphite or hypophosphorous acid being a reducing agent into the plating tank 20.

Moreover, the regenerating apparatus is provided with a controller 10 for governing the whole control of the apparatus.

The temperature sensor 20$a$, the pH sensor 20$b$, the nickel ion concentration sensor 20$c$, and the liquid level meter 20$d$ determine the temperature, the pH, the nickel ion concentration, and the liquid level of the plating solution 100 accumulated in the plating tank 20, respectively, to output the determination signals obtained to the controller 10. As the nickel ion concentration sensor 20$c$, a visible light colorimetry measurement device in which a visible light colorimetry measurement is implemented with respect to the plating solution 100 in the plating tank 20; and a nickel concentration is determined from the measurement result is suitable.

The controller 10 determines a formation rate of the phosphorous acid formed in the plating solution 100 in accordance with the nickel plating treatment on the basis of the measurement signals output from the respective sensors as described above. With increase in the formation of the phosphorus acid, the pH value decreases linearly. Namely, a concentration of the phosphorous acid is in inverse proportion to the pH value thereof. Accordingly, it is possible particularly to determine a formation rate of the phosphorous acid only by the measurement signal from the pH sensor 20b.

Furthermore, not only a pH change of the plating solution 100, but also a nickel concentration change in the plating solution 100 is in inverse proportion to a concentration change of the phosphorous acid. Moreover, a specific gravity change of the plating solution 100 is in direct proportion to a concentration change of the phosphorous acid. Furthermore, a refractive index change of the plating solution 100 is in direct proportion to a concentration change of the phosphorous acid. Thus, in order to improve the accuracy of measurements, the determination of the formation rate of the phosphorous acid may be made by taking into consideration properly the measurement signals other than those from the pH sensor 20b.

For instance, it may be arranged such that the plating tank 20 is appropriately provided (though the following devices are not shown) with: a specific gravity sensor for determining the specific gravity of the plating solution 100 in the plating tank 20 to output the measurement signal to the controller 10; a refractive index sensor for measuring the refractive index of the plating solution 100 in the plating tank 20 to output the measurement signal to the controller 10; an infrared spectroscopy measurement device for measuring the infrared spectroscopic characteristics of the plating solution 100 in the plating tank 20 to output the measurement signal to the controller 10; an electrophoresis capillary chromatography measurement sensor for conducting electrophoresis capillary chromatography measurement with respect to the plating solution 100 in the plating tank 20 to output the measurement signal to the controller 10; a liquid chromatography measurement sensor for conducting high-performance liquid chromatography measurement with respect to the plating solution 100 in the plating tank 20 to output the measurement signal to the controller 10; an ultraviolet spectroscopy measurement device for measuring the ultraviolet spectroscopic characteristics of the plating solution 100 in the plating tank 20 to output the measurement signal to the controller 10; or an ion chromatography measurement device for conducting ion chromatography measurement with respect to the plating solution 100 in the plating tank 20 to output the measurement signal to the controller 10; and these measurement signals are properly taken into consideration for the sake of calculating the formation rate of the phosphorous acid.

When the formation rate of the phosphorous acid is determined, the controller 10 generates a control signal for controlling the undermentioned valve 21e and a return pump 22; and the generated control signal is output to the valve 21e and the return pump 22.

The sample splitter 21 is a device for splitting a predetermined amount of the plating solution 100 accumulated in the plating tank 20 until it stands still just before opening and closing the valve 21e based on the control signal from the controller 10; and when a control signal is received by the sample splitter 21 from the controller 10, the predetermined amount of the plating solution 100 split is transferred to a stock tank 30 disposed on the downstream side of the splitter 21. The splitter 21 is provided with a split pump 21a, split piping 21b, a meterage pot 21c, return piping 21d, and the valve 21e disposed on the bottom portion of the meterage pot 21c and closed routinely, as shown in the constitutional diagram of FIG. 2.

The split pump 21a feeds the plating solution 100 to the meterage pot 21c from the plating tank 20 at a constant rate.

The meterage pot 21c is calibrated in such that a capacity in the condition that the valve 21e is closed corresponds to a predetermined amount and maintains only the predetermined amount of the plating solution 100 in the plating solution 100 of more than the predetermined amount which is supplied by the split pump 21a, and further an extra amount of a plating solution 100' overflows from an overflow uptake 21f. In addition, when the plating solution 100 is transferred into the meterage pot 21c from the split piping 21b, a gas component 108 contained in the plating solution 100 escapes from an upper opening 21g of the sample splitter 21.

The plating solution 100' overflowed is adapted to be guided to the return piping 21d through the overflow uptake 21f, and to be returned to the plating tank 20. When the valve 21e is opened based on the control signal from the controller 10 under the condition that the meterage pot 21c is filled with the plating solution 100, the plating solution 100 in the meterage pot 21c drops due to gravitational force to transfer the plating solution 100 to the stock tank 30. On one hand, when the pH of the plating solution reaches a set value or less, the plating solution from which a certain amount of phosphorous acid has been separated and removed is thrown into the plating tank 20 by the use of a pump from a buffer tank (not shown); at the same time, the same amount of the plating solution is fed in the stock tank 30 by using a metering pump from the plating tank 20; and the same operation is repeated until the pH reaches the set value. In this case, if a concentration of the phosphorous acid in the plating solution is constant, an amount of phosphorous acid to be separated becomes also constant. As a result, no calculation is required for an amount of the alkali calcium to be added in each case, so that the operation becomes very simple. In place of a pH sensor for determining pH, when a refractive index sensor for determining refractive index is applied as a sensor, the pH in the plating tank 20 may be adjusted independently, whereby the pH control of the plating solution becomes accurate.

As mentioned above, the sample splitter 21 transfers a predetermined amount of the plating solution 100 to the stock tank 30 in response to a formation rate of the phosphorous acid.

The stock tank 30 is provided with a phosphorous acid concentration measurement sensor 31. When the phosphorous acid concentration measurement sensor 31 determines a concentration of the phosphorous acid contained in the plating solution 100 in the stock tank 30, the measurement signal is output to the controller 10.

As a result, the controller 10 calculates an amount of calcium carbonate or calcium hydroxide required for producing calcium phosphite from the phosphorous acid contained in the predetermined amount of the plating solution 100 based on the predetermined amount and the measurement signal from the concentration measurement sensor 31, whereby the calculated result is output to an alkali calcium addition device 13 which will be mentioned hereinbelow; and further the controller 10 transmits a seizing signal to a pump 32 disposed on the downstream side of the stock tank 30.

As described above, when the seizing signal is transmitted to the pump 32 from the controller 10, the pump 32 starts to transfer the plating solution 100 in the stock tank 30 to a first processing tank 11 with a built-in temperature holding device while a valve 14a is closed.

The first processing tank 11 is provided with a temperature sensor 11a, a pH sensor 11b, an ultrasonic oscillator 11c, a first agitator 12, and the alkali calcium addition device 13. The temperature sensor 11a and the pH sensor 11b determine the temperature and the pH of the liquid in the first processing tank 11, respectively, and output the measurement signals to the controller 10. The controller 10 controls a heater 19*a* based on the temperature determination result from the temperature sensor 11*a*, whereby a liquid temperature in the first processing tank 11 is maintained at a value within a range which has been determined previously. The alkali calcium addition device 13 adds the alkali calcium 104 composed of at least one of calcium carbonate or calcium hydroxide powder or slurry to the plating solution 100 accumulated in the first processing tank 11 in an amount determined on the basis of the calculated result transmitted from the controller 10.

The first agitator 12 agitates the plating solution 100 to which the alkali calcium 104 is thus added in the first processing tank 11. Moreover, the ultrasonic oscillator 11*c* assists the agitating operation of the first agitator 12. Hence, admixing of the plating solution 100 with the alkali calcium 104 is accelerated. Then, the valve 14*a* is opened in such a stage that the plating solution 100 is admixed sufficiently with the alkali calcium 104, whereby the phosphorous acid contained in the plating solution 100 reacts with the alkali calcium 104 to produce calcium phosphite 105, so that the liquid in the first processing tank 11 is guided to a solid-liquid separator 14 by means of the dropping due to gravitational force.

The solid-liquid separator 14 is a device for removing the calcium phosphite produced from the plating solution 100 wherein the calcium phosphite 105 is removed by filtrating it with the use of a pressure filter or a depressure filter, or applying a centrifugal separator. The solid-liquid separator 14 is not composed necessarily of any one of the above-described means, but the solid-liquid separator 14 may be composed of an appropriate combination of a pressure filter, a depressure filter, and a centrifugal separator.

Furthermore, the solid-liquid separator 14 has a throw-out function for throwing the calcium phosphite 105 thus removed out of the device.

The pump 25 transfers the plating solution 100 from which the calcium phosphite 105 has been removed as described above to a second processing tank 15 from the solid-liquid separator 14.

The second processing tank 15 is a tank for accumulating the plating solution 100 from which the calcium phosphite 105 is thus removed. The second processing tank 15 is further provided with a second agitator 16, a replenishment device 18, a temperature sensor 15*a*, and a pH sensor 15*b* as the associated implements.

The second agitator 16 agitates the plating solution 100 in the second processing tank 15. The replenishment device 18 may add a fresh plating solution into the second processing tank 15, the fresh plating solution being the one for replenishing a reducing agent 102 consumed in accordance with the progress of the nickel plating which was applied to the target material 1 in the plating tank 20, the plating solution lost accompanied with the target material in case of pulling up the target material 1 from the plating tank 20, the plating solution lost as a result of suction thereof by a duct in the form of mist, and the plating solution lost accompanied with the cake in case of separating calcium phosphite. The temperature sensor 15*a* determines a temperature of the plating solution 100 in the second processing tank 15 to output the measurement signal to the controller 10. The controller 10 controls a heater 19*b* based on the temperature determination result from the temperature sensor 15*a*, whereby a liquid temperature in the second processing tank 15 is maintained at a value within a range which has been previously determined. The pH sensor 15*b* determines a pH of the plating solution 100 in the second processing tank 15 to output the Measurement signal to the controller 10.

In addition, an accurate filter 23 is disposed on the downstream side of the second processing tank 15, the accurate filter 23 removing fine insoluble matters 107 in the plating solution 100 to be returned to the plating tank 20 from the interior of the second processing tank 15. The accurate filter 23 may also be constituted in an appropriate combination of, for example, a pressure filter, a depressure filter, and a centrifugal separator as in the case of the solid-liquid separator 14.

Furthermore, a return pump 22 is disposed on the downstream side of the accurate filter 23. When a control signal from the controller 10 is received by the return pump 22, the return pump 22 transfers the plating solution 100 accumulated in the second processing tank 15 to the side of the plating tank 20 in cooperation with the split pump 21*a* at a transfer rate in accordance with the control signal. Thus, it is arranged such that the split pump 21*a* takes out the plating solution 100 from the plating tank 20, while the return pump 22 transfers the plating solution 100 to the plating tank 20 in cooperation with the split pump 21*a* at the same transfer rate as that of the split pump 21*a*, whereby the composition and the liquid level of the plating solution 100 in the plating tank 20 are kept constant, so that the quality in the nickel plating treatment does not change with respect to the target material 1.

Figure 2:
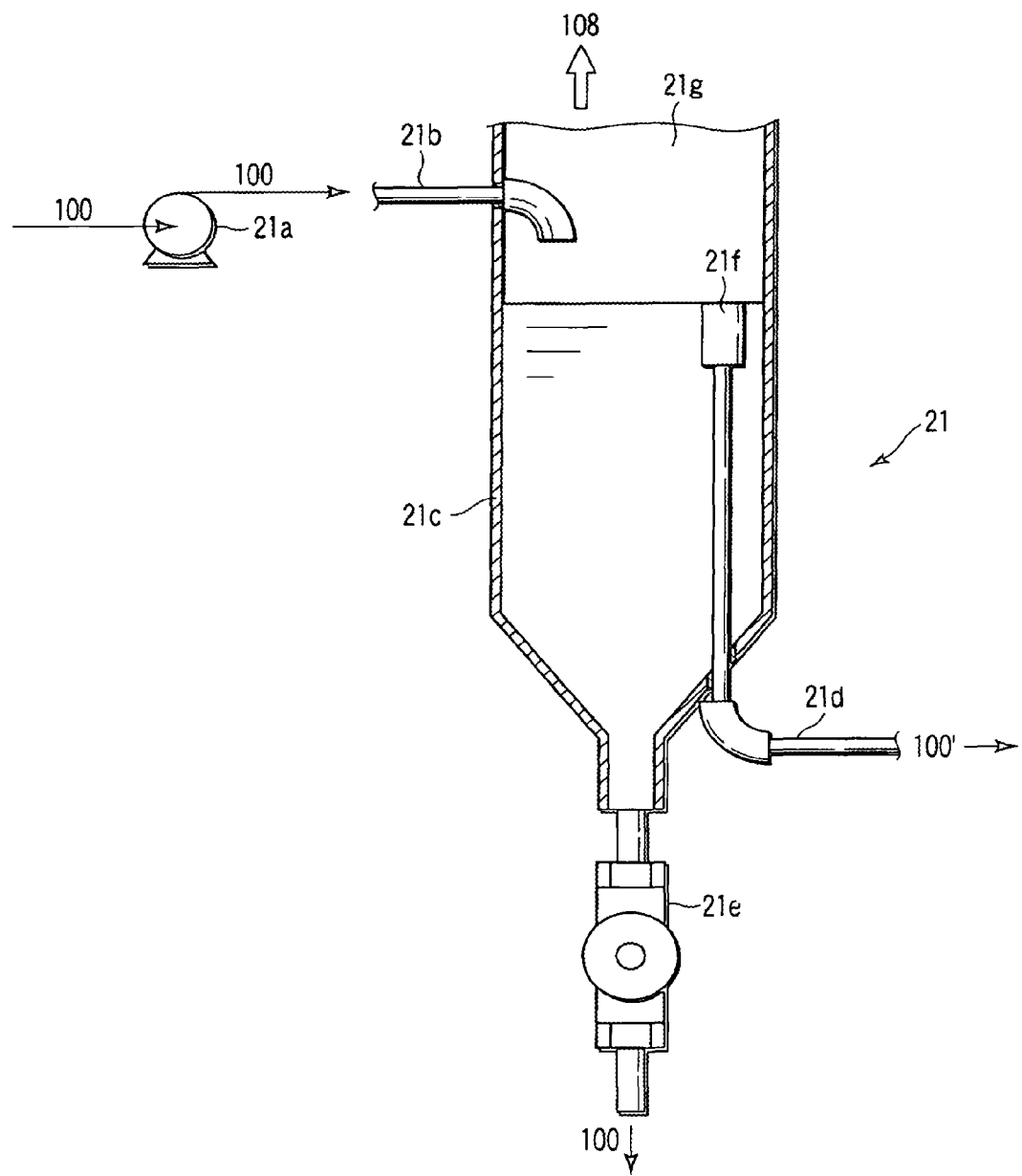
FIG. 2 is a schematic diagram showing a constitutional example of a sample splitter.

The return pump 22 as described above may have the same constitution as that of the sample splitter 21 as shown in FIG. 2. In this case, however, since there is no generation of offgas from the plating solution 100, the upper opening 21*g* may be closed.

It is to be noted that the plating solution 100 mentioned above is not made of a nickel sulfate-sodium hypophosphite system, but made of a nickel hypophosphite-hypophosphorous acid system which does not finally contain sulfate ion component. The plating solution 100 contains not only the above-mentioned nickel source 101 and the reducing agent 102, but also a variety of auxiliary materials 106 which have been used heretofore such as a complexing agent, a stabilizer, a brightening agent, and a surfactant.

As described above, the regeneration apparatus to which the regeneration method for an electroless plating solution according to an embodiment of the present invention is applied gets hold of a formation rate of the phosphorous acid formed in the plating solution 100 in accordance with the nickel plating treatment, and regenerates the plating solution 100 in accordance with the formation rate to return the plating solution 100 regenerated to the plating tank 20. In the case where a surface area of the target material 1 to be nickel-plated is comparatively large or a plating rate is comparatively fast, the formation rate of phosphorous acid becomes also fast, so that a return rate of the plating solution 100 regenerated to the plating tank 20 becomes also fast, a split rate is in proportional to the return rate, and it results in a fast rate, whereby a cycle for removing process of the phosphorous acid becomes frequent. On the other hand, in the case where an amount of the target material 1 is comparatively small, a surface area of the target material 1 is comparatively small or a plating rate becomes comparatively slow, the formation rate of phosphorous acid also becomes slow, so that the split rate of the plating solution for processing the phosphorous acid becomes also small, whereby a cycle for removing process of the phosphorous acid becomes comparatively prolonged. Moreover, when no target material 1 exists in the plating tank 20, no phosphorous acid appears; and as a result, there is no return of the regenerated plating solution 100 to the plating tank 20, so that the split rate of the plating solution 100 becomes zero, whereby the regeneration treatment of the plating solution 100 is stopped.

Figure 3:
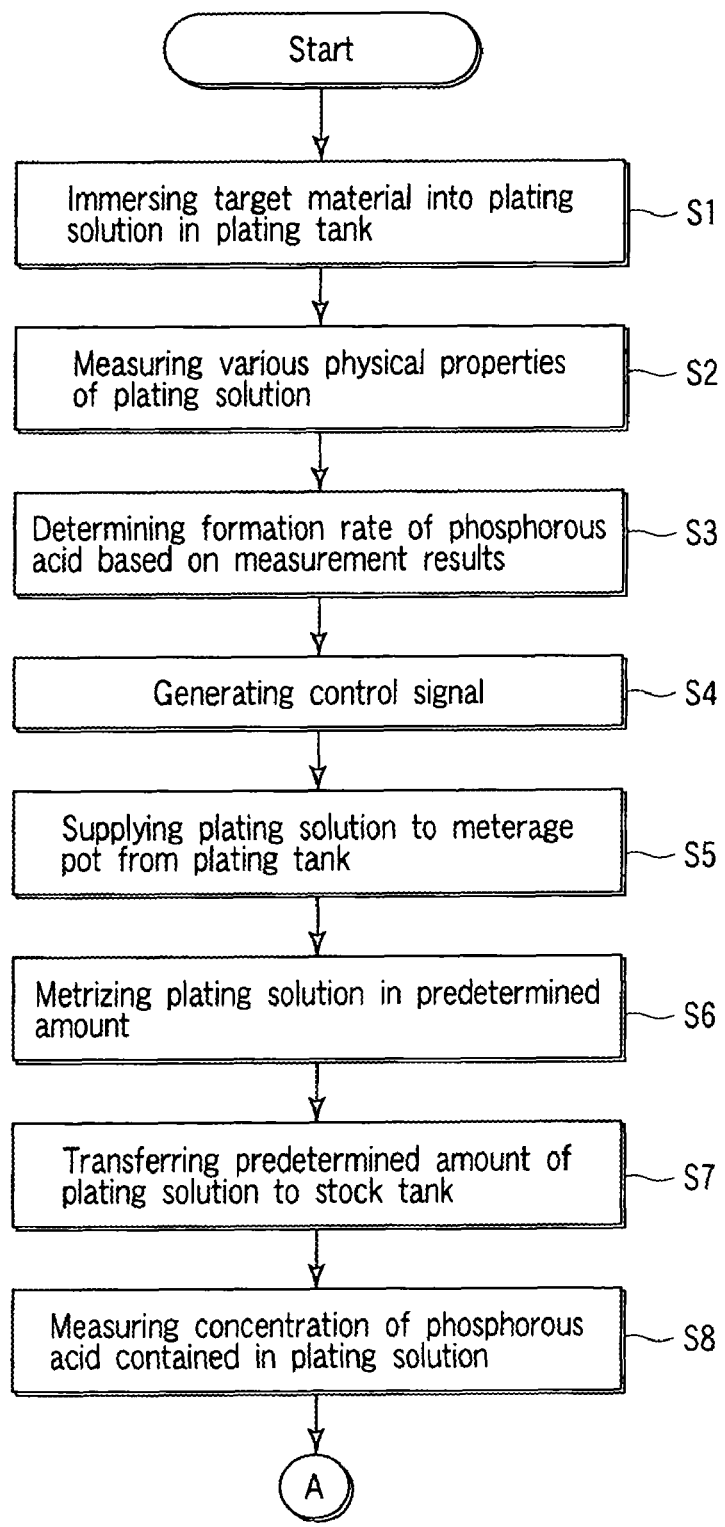
FIG. 3 is a flowchart showing operations of the regenerating apparatus to which the regenerating method for the electroless plating solution according to the embodiment of the present invention is applied.
Figure 4:
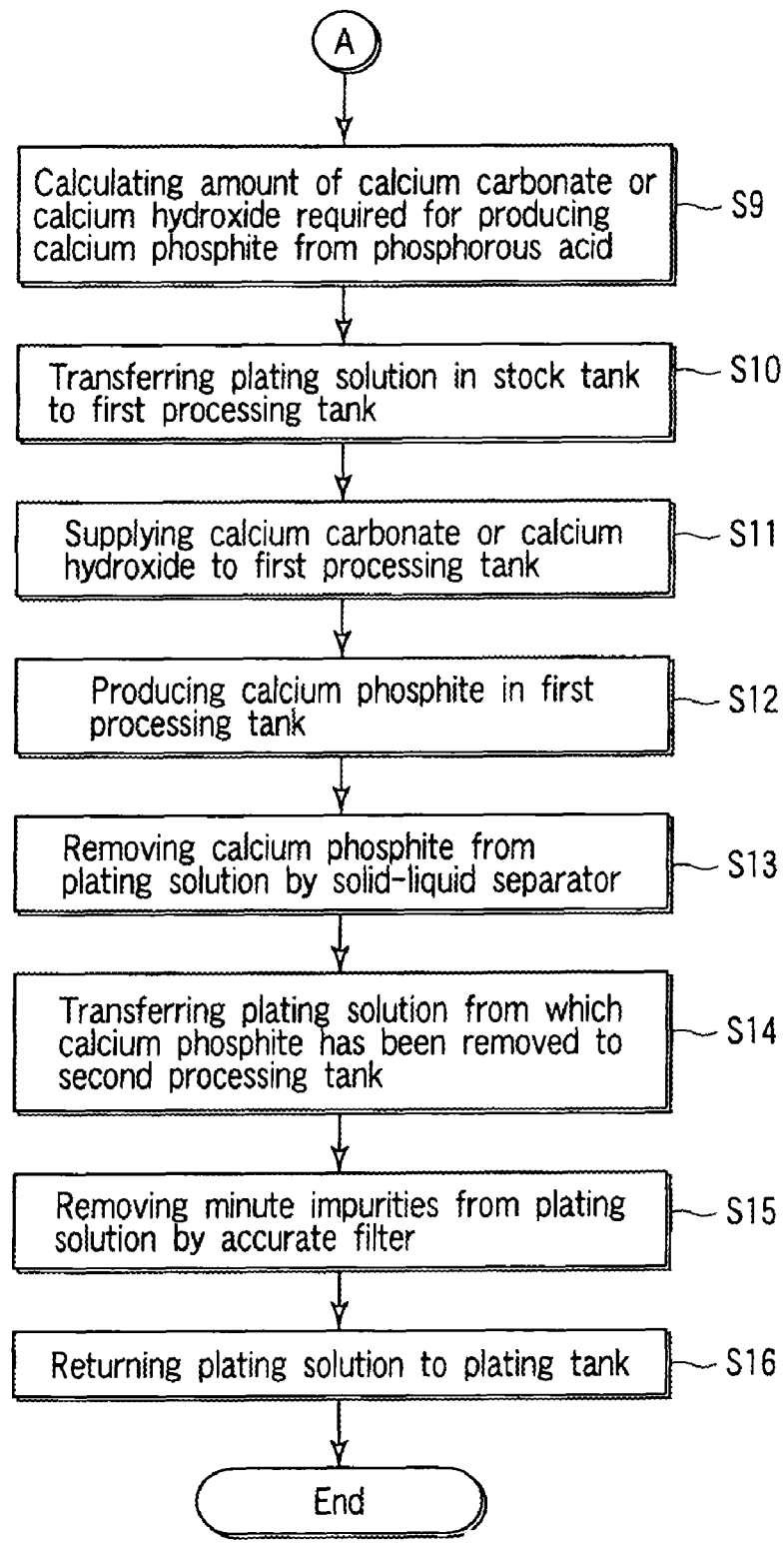
FIG. 4 is a flowchart showing operations of the regenerating apparatus to which the regenerating method for the electroless plating solution according to the embodiment of the present invention is applied.

In the following, operations of the regeneration apparatus to which the regeneration method for an electroless plating solution according to an embodiment of the present invention constituted as described above has been applied will be described referring to the flowcharts shown in FIGS. 3 and 4.

When the target material 1 is nickel-plated, the target material 1 is suspended from the hoisting attachment 2 and the hoisting attachment 2 is lowered to immerse the target material 1 into the plating solution 100 in the plating tank 20, whereby the nickel plating treatment is carried out while maintaining this condition (step S1).

The plating tank 20 is provided with the nickel source replenishment device 17 for replenishing the nickel source consumed in response to the progress of the nickel plating to the target material 1, and the addition device 24 for adding a pH adjustment agent 103 made of a sodium hydroxide solution into the plating tank 20, whereby a condition required for nickel plating is satisfied.

Moreover, the plating tank 20 is provided with the temperature sensor 20a, the pH sensor 20b, the nickel ion concentration sensor 20c, the liquid level meter 20d, and further (although the following implements are not shown) a specific gravity sensor, a refractive index sensor, an infrared spectroscopic measurement device, an electrophoresis capillary chromatography measurement sensor, a liquid chromatography measurement sensor, an ultraviolet spectroscopic measurement device, and an ion chromatography measurement device according to need.

When the plating treatment proceeds in the plating tank 20, phosphorous acid is produced in the plating solution 100 with the progress of the plating treatment. In this respect, changes in the physical properties of the plating solution 100 dependent on the progress of the plating treatment are determined always by means of the above-described respective sensors and measurement devices; and the determination results are output to the controller 10 (step S2).

In the controller 10, the formation rate of the phosphorous acid formed in the plating solution 100 is determined on the basis of the measurement signals output from the respective sensors and measurement devices in the manners as described above (step S3). With the progress of the formation of phosphorous acid, the pH value decreases linearly thereby. Accordingly, it is possible to determine the formation rate of phosphorous acid by means only of the measurement signals from the pH sensor 20b. In this respect, however, it may be arranged to determine the formation rate of phosphorous acid by applying properly the measurement signals other than that of the pH sensor 20b in order to elevate the precision in the formation rate of phosphorous acid.

Thereafter, the controller 10 generates the control signals for controlling the valve 21e and the return pump 22; and the control signals generated are output to the valve 21e and the return pump 22 (step S4).

The plating solution 100 is supplied always at a constant rate by the split pump 21a to the meterage pot 21c from the plating tank 20 (step S5).

The meterage pot 21c is calibrated such that the capacity thereof while the valve 21e is closed corresponds to a predetermined amount. As a result, only the predetermined amount of the plating solution 100 is maintained in the meterage pot 21c in the plating solution 100 supplied by the split pump 21a in the step S5. On the other hand, the extra plating solution 100' overflows to be taken in the overflow uptake 21f, and then, it is returned to the plating tank 20 through the return piping 21d (step S6).

As described above, when the pump 21a is stopped and the valve 21e is opened based on the control signal from the controller 10 in the condition that the meterage pot 21c is filled with the plating solution 100, the plating solution 100 in the meterage pot 21c drops due to gravitational force, whereby the predetermined amount of the plating solution 100 is transferred to the stock tank 30 (step S7).

The stock tank 30, in the system from the meterage pot 21c to the first processing tank 11, is provided with the concentration measurement sensor 31. The phosphorous acid contained in the plating solution transferred to the stock tank 30 is measured by the concentration measurement sensor 31, and the measurement signal is output to the controller 10 (step S8).

As a result, the controller 10 calculates an amount of calcium carbonate or calcium hydroxide required for producing calcium phosphite from the phosphorous acid contained in the predetermined amount of the plating solution 100 based on the predetermined amount and the measurement signal from the concentration measurement sensor 31, whereby the calculated result is output to an alkali calcium addition device 13; and further the controller 10 transmits a seizing signal to a pump 32 disposed on the downstream side of the stock tank 30 (step S9).

As described above, when the seizing signal is transmitted to the pump 32 from the controller 10, the pump 32 starts to transfer the plating solution 100 in the stock tank 30 to the first processing tank 11 while the valve 14a is closed (step S10).

The first processing tank 11 is provided with the temperature sensor 11a, the pH sensor 11b, the ultrasonic oscillator 11c, the first agitator 12, and the alkali calcium addition device 13. The temperature sensor 11a and the pH sensor 11b determine the temperature and the pH of the liquid in the first processing tank 11, respectively, and output the measurement signals to the controller 10. On the other hand, the alkali calcium 104 composed of at least one of calcium carbonate or calcium hydroxide powder or slurry is added into the first processing tank 11 from the alkali calcium addition device 13 in an amount determined on the basis of the calculated result transmitted from the controller 10 (step S11).

As described above, the alkali calcium 104 and the plating solution 100 admixed together in the first processing tank 11 is agitated by the first agitator 12 to be mixed further. Moreover, when the plating solution 100 is agitated with use of the ultrasonic oscillator 11c in addition to the first agitator 12, the agitation efficiency can be further improved.

Hence, admixing of the plating solution 100 with the alkali calcium 104 is accelerated, whereby the phosphorous acid contained in the plating solution 100 reacts with the alkali calcium 104 to produce calcium phosphite 105 (step S12). When the valve 14a is opened at the stage in which the calcium phosphite 105 is sufficiently produced, the liquid in the first processing tank 11 is guided to a solid-liquid separator 14 by means of the dropping due to gravitational force.

In the solid-liquid separator 14, the calcium phosphite 105 is removed by means of filtration or centrifugal separation, and then, it is taken out to the outside of the solid-liquid separator 14 (step S13).

On the other hand, the plating solution 100 from which the calcium phosphite 105 is removed as described above is transferred to the second processing tank 15 by means of the pump 25 (step S14).

To the plating solution 100 transferred to the second processing tank 15, the reducing agent 102 an amount of which corresponds to that consumed with the progress of the nickel plating on the target material 1 in the plating tank 20 is supplied from the replenishment device 18 according to need. Furthermore, the second processing tank 15 is provided with the second agitator 16. As a result, even when the reducing agent 102 is supplied to the second processing tank 15, they are homogeneously mixed by the agitation of the second agitator 16. Furthermore, a temperature and a pH of the plating solution 100 in the second processing tank 15 are measured respectively by means of the temperature sensor 15a and the pH sensor 15b; and the measurement results are output to the controller 10.

The return pump 22 is disposed on the downstream side of the second processing tank 15. The return pump 22 cooperates with the valve 21e by means of the control signal from the controller 10 as the trigger and operated at the transfer rate in accordance with the control signal, whereby the plating solution 100 accumulated in the second processing tank 15 is transferred to the plating tank 20 through the accurate filter 23. As a result, minute impurities 107 are removed by the accurate filter 23 from the plating solution 100 accumulated in the second processing tank 15 (step S15), and thereafter, the resulting plating solution is returned to the plating tank 20 (step S16).

As mentioned above, in the regeneration apparatus to which the regeneration method for an electroless plating solution according to an embodiment of the present invention is applied, it becomes possible that the formation rate of the phosphorous acid produced in the plating solution 100 with the progress of the nickel plating treatment is grasped by the manner as described above, and the plating solution 100 is subjected to regeneration treatment in response to the formation rate, whereby the plating solution thus regenerated is returned to the plating tank 20. In this case, if the surface area of the target material 1 to be nickel-plated is comparatively large, or the plating rate thereof is comparatively fast, the formation rate of phosphorous acid also becomes fast. In this respect, however, the return rate of the regenerated plating solution 100 to the plating tank 20 may be accelerated in response to the faster formation rate of phosphorous acid. Accordingly, it becomes possible to accelerate the split rate of the plating solution and to shorten a period of the removal treatment of the phosphorous acid.

On the other hand, in the case where an amount of the target material 1 is comparatively small, the surface area thereof is comparatively small, or a plating rate is comparatively slow, the formation rate of phosphorous acid also becomes slow. In this respect, however, the split rate of the plating solution to process the phosphorous acid may be retarded. Accordingly, it becomes possible to prolong a period for removing the phosphorous acid in response to the slower formation rate of the phosphorous acid.

Moreover, when no target material 1 exists in the plating tank 20, no phosphorous acid appears. In this case, since the formation rate of phosphorous acid is zero, there is no return of the regenerated plating solution 100 to the plating tank 20, so that the split rate of the plating solution 100 may be made zero, whereby the regeneration treatment of the plating solution 100 may be stopped.

As described above, in accordance with the regeneration apparatus to which the regeneration method for an electroless plating solution according to an embodiment of the present invention is applied, the regeneration rate of the plating solution 100 may be adjusted in response to the formation rate of phosphorous acid. Thus, it becomes possible to practice efficiently and automatically the regeneration of the plating solution 100 in response to the condition of a plating treatment.

Although the best mode for executing the present invention has been described above referring to the accompanying drawings, it is to be noted that the invention is not restricted to the constitution as described above. It will be appreciated by those skilled in the art that a variety of changes and modifications can be made within the scope of technical concept of the claimed inventions, and these changes and modifications belong to the technical scope of the present invention.

For instance, the systematic constitution shown in FIG. 1 is a typical example for explaining the concepts of the present invention, and a pump, a valve, an auxiliary tank and the like may be suitably added on the way in the piping; and it should be considered that such modifications are also involved in the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A regeneration method for an electroless plating solution comprising:

measuring a formation rate of a phosphorous acid formed in accordance with a nickel plating treatment in a plating tank to accumulate a plating solution in which nickel hypophosphite is used as a nickel source and at least one or more of nickel hypophosphite, sodium hypophosphite, and hypophosphorous acid are used as reducing agents, and applying the nickel plating treatment to a target material using the plating solution;

generating a control signal for controlling a transfer rate based on the measured formation rate, and outputting the generated control signal to a splitter and a return pump;

taking out a predetermined amount of the plating solution accumulated in the plating tank using a split pump, and receiving the plating solution taken out by the split pump into a meterage pot;

adjusting the amount of the plating solution in the meterage pot to the predetermined amount of the plating solution; transferring the predetermined amount of the plating solution from the meterage pot to a stock tank in accordance with the control signal, when the control signal is received by splitter;

measuring a concentration of the phosphorous acid contained in the predetermined amount of the plating solution taken out;

calculating an amount of calcium carbonate or calcium hydroxide required for producing a calcium phosphite from the phosphorous acid contained in the predetermined amount of the plating solution based on the predetermined amount and the measured concentration of the phosphorous acid generating a seizing signal for controlling the transfer of the predetermined amount of the plating solution stocked in the stock tank to a processing tank based on the calculated amount of calcium carbonate or calcium hydroxide;

supplying the calculated amount of calcium carbonate or the calcium hydroxide to the processing tank when the seizing signal is transmitted to another pump; separating and removing, from the plating solution, calcium phosphite formed by admixing the calcium carbonate or the calcium hydroxide supplied to the processing tank with the predetermined amount of the plating solution in the processing tank; and transferring the plating solution from which the calcium phosphite is separated and removed at the transfer rate in accordance with the control signal in cooperation with the splitter to the plating tank, when the control signal is received by the return pump.

* * * * *